United States Patent
Britt et al.

(10) Patent No.: US 10,530,935 B1
(45) Date of Patent: *Jan. 7, 2020

(54) SUPPORT SERVICES FOR VIRTUAL DATA CENTERS

(71) Applicant: 8×8, Inc., San Jose, CA (US)

(72) Inventors: Timothy Britt, San Jose, CA (US); Bryan Martin, San Jose, CA (US); Christopher Peters, San Jose, CA (US)

(73) Assignee: 8×8, Inc., San Jose, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/582,744

(22) Filed: Dec. 24, 2014

Related U.S. Application Data

(60) Provisional application No. 61/975,462, filed on Apr. 4, 2014, provisional application No. 61/975,295, filed on Apr. 4, 2014, provisional application No. 61/975,314, filed on Apr. 4, 2014, provisional application No. 61/975,346, filed on Apr. 4, 2014, provisional application No. 61/975,371, filed on Apr. 4, 2014, provisional application No. 61/983,792, filed on Apr. 24, 2014.

(51) Int. Cl.
*H04L 29/12* (2006.01)
*H04M 7/00* (2006.01)
(Continued)

(52) U.S. Cl.
CPC .......... *H04M 7/0087* (2013.01); *H04L 41/22* (2013.01); *H04L 47/125* (2013.01);
(Continued)

(58) Field of Classification Search
CPC ... H04M 7/0087; H04M 7/0084; H04L 41/22; H04L 47/125; H04L 47/2416; H04L 61/106; H04L 61/1582
See application file for complete search history.

(56) References Cited

U.S. PATENT DOCUMENTS

| 7,289,491 B2 | 10/2007 | Singh |
| 8,204,206 B2 | 6/2012 | Townsend |

(Continued)

FOREIGN PATENT DOCUMENTS

WO 1996042041 A2 12/1996

OTHER PUBLICATIONS

International Telecommunications Union, Series P: Telephone Transmission Quality, Telephone Installations, Local Line Networks, ITU-T Recommendation p. 862, "Perceptual evaluation of speech quality (PESQ): An objective method for end-to-end speech quality assessment of narrow-band telephone networks and speech codecs," Feb. 2001.

(Continued)

*Primary Examiner* — Kent K Krueger
(74) *Attorney, Agent, or Firm* — Crawford Maunu PLLC

(57) ABSTRACT

Various example implementations are directed to circuits, apparatuses, and methods for providing virtual computing services. According to an example embodiment, an apparatus includes a data storage device and a set of computing servers communicatively coupled to the data storage device. The set of computer servers are configured to provide a respective virtual data center for each of a plurality of accounts. The respective virtual data center for each account is configured to provide virtual services specified in a respective settings file for the account stored in the data storage device. The virtual data center for at least one of the accounts includes a set of virtual desktops and a set virtual servers, including at least one Voice-over-IP (VoIP) server. A processing circuit is communicatively coupled to the computing servers and is configured to, for each account, provide support services specified in the settings file for the account.

20 Claims, 10 Drawing Sheets

(51) Int. Cl.
*H04L 12/803* (2013.01)
*H04L 12/853* (2013.01)
*H04L 12/24* (2006.01)

(52) U.S. Cl.
CPC ........ *H04L 47/2416* (2013.01); *H04L 61/106* (2013.01); *H04L 61/1582* (2013.01); *H04M 7/0084* (2013.01)

(56) References Cited

U.S. PATENT DOCUMENTS

| | | | |
|---|---|---|---|
| 2002/0165953 A1* | 11/2002 | Diong | H04L 12/2602 709/224 |
| 2002/0184575 A1 | 12/2002 | Landan | |
| 2004/0162781 A1 | 8/2004 | Searl et al. | |
| 2008/0225748 A1* | 9/2008 | Khemani | H04L 41/0893 370/254 |
| 2009/0144413 A1 | 6/2009 | Khan et al. | |
| 2009/0288084 A1* | 11/2009 | Astete | G06F 9/45533 718/1 |
| 2014/0344326 A1* | 11/2014 | Kamath | H04L 67/1008 709/203 |
| 2015/0229546 A1* | 8/2015 | Somaiya | H04L 43/045 715/736 |

OTHER PUBLICATIONS

Radvision, "Back-to-Back User Agent (B2BUA) SIP Servers Powering Next Generation Networks: A Functional and Architectural Look at Back-to-Back User Agent (B2BUA) SIP Servers," 2007.

\* cited by examiner

SUPPORT SERVICES FOR VIRTUAL DATA CENTERS

OVERVIEW

Various example implementations are directed to circuits, apparatuses, and methods for providing virtual computing services. These include such services provided by computing servers that provide various services over a network including, but not limited to, website hosting, remote data storage, remote computing services, virtual computing environments and communication services such as: Voice-over-IP (VoIP), video conferencing, call exchange servers, packet switching, and/or traffic management.

Various example implementations are directed to circuits, apparatuses, and methods for providing virtual computing services. According to an example embodiment, an apparatus includes a data storage device and a set of computing servers communicatively coupled to the data storage device. The set of computer servers are configured to provide a respective virtual data center for each of a plurality of accounts. The respective virtual data center for each account is configured to provide virtual services specified in a respective settings file for the account stored in the data storage device. The virtual data center for at least one of the accounts includes a set of virtual desktops and a set virtual servers, including at least one VoIP server. A processing circuit is communicatively coupled to the set of computing servers and is configured to provide, for each account, provide respective support services specified in the settings file for the account.

The support services provided for an account may include various services that supplement virtual computing services provided by the virtual data center for the account. In one example embodiment, the support services provided for the first account include a domain name server (DNS) configured to dynamically map a respective set of domain names to network addresses of the one or more virtual servers included in the virtual data center for the account according to a mapping function indicated in the settings file of the account.

According to another example embodiment, the support services provided for the first account monitor an operating state of each of the set of virtual servers provided for the account. In one example implementation, support services for the first account are configured to generate an alert to a user indicated in the settings file for the account in response to the operating state of the one or more virtual servers satisfying alert criteria specified in an alert policy in the settings file. In another example implementation, the support services for the first account provide a web-based graphical user interface (GUI) configured to display a respective timeline for each server of the set of virtual servers. Each timeline has a respective time block for each of a plurality of time periods. Each time block has a graphical indication of one of the three states of operation corresponding to the operating state of the virtual server at the corresponding time period.

According to another example embodiment, the support services for the first account provide a GUI having a mechanism for an authorized user of the account to select options for reporting use of the respective set of virtual servers. The support services for the first account also monitor use of the respective set of virtual servers and generate reports, according to the selected options, for use of the respective set of virtual servers.

BRIEF DESCRIPTION OF THE DRAWINGS

The disclosure may be more completely understood in consideration of the following detailed description of various embodiments of the disclosure in connection with the accompanying drawings, in which.

Figure 1:
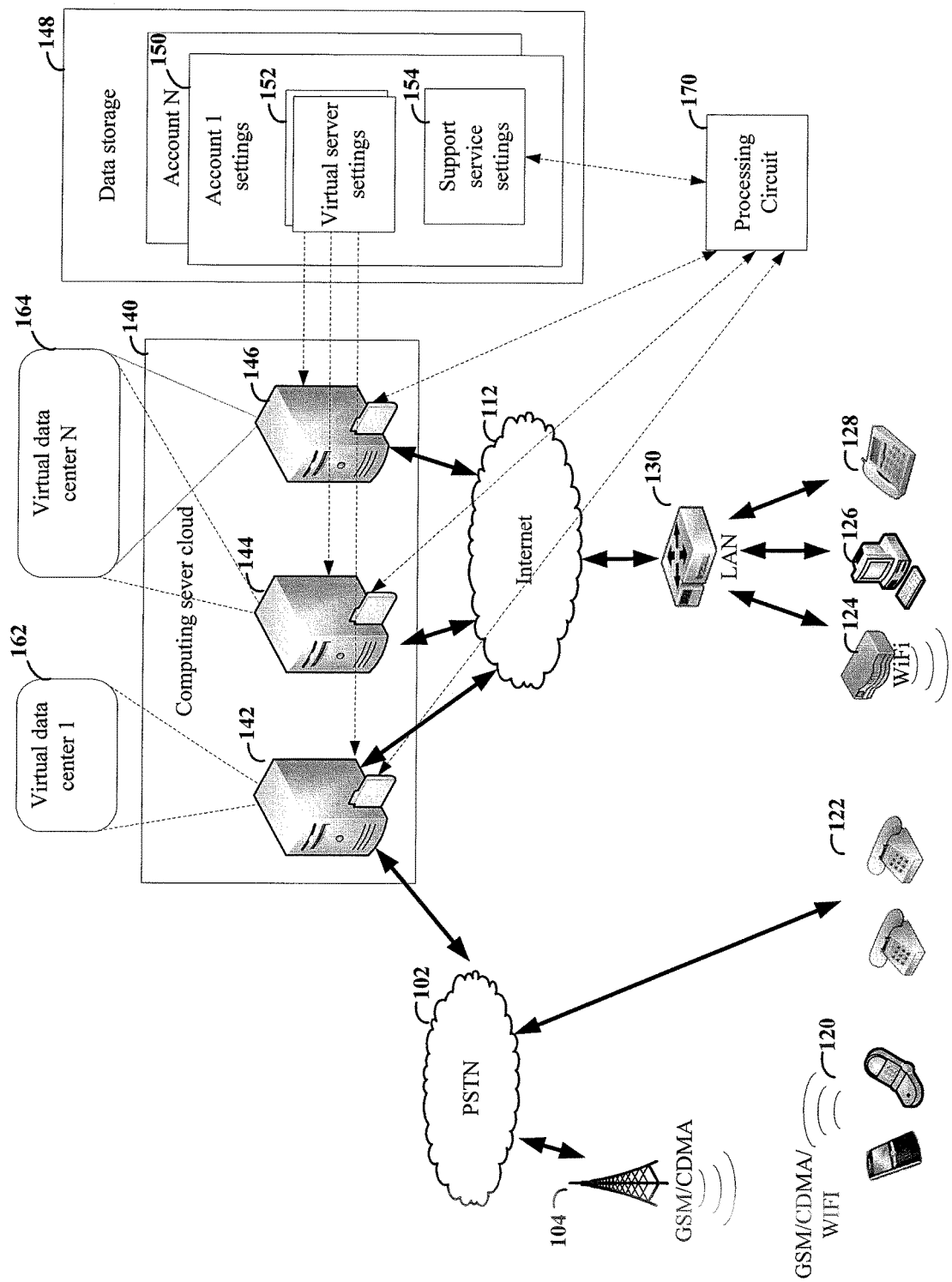
FIG. 1 shows an example network architecture having a set of servers configured to provide virtual services for a plurality of accounts, in accordance with one or more embodiments.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DESCRIPTION

Aspects of the present disclosure are believed to be applicable to a variety of different types of apparatuses, systems and methods that use computing servers to provide respective virtual computing services and related support services for each of a plurality of customer accounts. In certain implementations, aspects of the present disclosure have been shown to be beneficial when used in the context of providing a respective virtual data center and respective support services for each of a plurality of accounts. As an example, a virtual data center may be used to provide a virtual office (e.g. having virtual servers, virtual desktop and/or other virtual resources) in which remote employees can access resources and communicate with other employees and/or customers in an efficient manner. The support services may include various services that complement the virtual servers, virtual desktops or other virtual resources included in the virtual data center. For instance, support services for an account may include, DNS mapping of IP addresses for virtual servers in the virtual data center, monitoring status of the virtual servers, configurable status based-alerts, monitoring usage of virtual servers and/or expense reporting. While the disclosed embodiments are not necessarily limited to such applications, various aspects of the present disclosure may be appreciated in this context.

In one or more embodiments, an apparatus includes a data storage device and a set of computing servers communicatively coupled to the data storage device. The set of computer servers are configured to provide a respective virtual data center for each of a plurality of accounts. The virtual data center for an account includes a group of virtual desktops and/or virtual servers specified in a respective settings file for the account. For example, the virtual data center for an account may include a set of virtual desktops and a set of virtual servers, including at least one VoIP server. The VoIP server may be used to provide VoIP service for a plurality of users of the account. A processing circuit is communicatively coupled to the set of computing servers and is configured to provide, for each account, respective support services specified in the settings file for the account.

The settings file for each account may include server settings for each virtual desktop and/or virtual servers included in the respective virtual data center. The server settings may include a pointer to a VMware image and also specify computing resources to dedicate the execution of the corresponding virtual desktops and/or virtual servers. The virtual servers may provide various types of services including, for example file servers, email servers, web hosting, virtual meeting services (e.g., VoIP), billing, and/or remote computing services, routing, load balancing, and/or switch board services (e.g., Private Branch Exchange). The virtual desktops and/or virtual servers are interconnected in the virtual data center according to data center configuration settings included in the respective settings files for the account. During operation, the computing services emulate the virtual data center by emulating the virtual desktops and/or virtual servers indicated in the server settings and also emulating a virtual network connecting the virtual desktops and/or virtual servers. The virtual network includes the virtual connections specified in the respective settings file for the account. In some implementations, emulation of the virtual data center includes execution of a resource management process, configured to assign computing resources allocated for the data center for emulation of the virtual desktops, virtual servers, and connections of the data center.

In some implementations, the virtual data center provides a perimeter firewall between an internal network of the virtual data center and an external network. The perimeter firewall may provide network protection for the virtual data center with stateful packet inspection, access-control lists, network address translation (NAT) and/or virtual private network (VPN) connections. In some implementations, the virtual data center may also include individual firewalls isolating one or more virtual servers/desktops from other virtual servers/desktops in the virtual data center. In some implementations a web-based graphical user interface (GUI) is provided for configuration of access rules enforced by the firewall(s) which may include, for example, whitelists or blacklists of services to pass or block. The access rules enforced by the firewall(s) may also include whitelists or blacklists of users or IP addresses to block or allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN), compute and network infrastructure. VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial-attached-SCSI (SAS) connectors attaching it to diverse storage processors inside the storage area network. The dual SAS connections allow the storage area network to see the disks on separate data paths and, in the event of a failure, re-route the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some embodiments, the plurality of computing servers and/or the processing circuit is configured to provide a GUI for adjusting configuration settings of the data center specified in the settings file for an account. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/time, memory, or storage) for the account to particular virtual desktops and/or virtual servers in the data center. The GUI may also provide a mechanism to import and/or replicate virtual machines in the data center. In some implementations, the GUI may provide the ability to save a backup or snapshot of the layout and configuration of the virtual data center.

The respective settings file for each account may be set to cause the processing circuit to provide various support services, which complement the virtual servers, virtual desktops or other virtual resources included in the virtual data center provided for the account. In some embodiments, the support services provided for the first account include a domain name server (DNS) configured to dynamically map domain names to virtual servers included in the virtual data center for the account according to a mapping function indicated in the settings file of the account. In some embodiments, the support services provided for an account are configured to monitor an operating state of each of the set of virtual servers provided for the account. In some implementations, the support services for the account may generate alerts in response to the operating state of the virtual servers satisfying alert criteria specified in an alert policy in the settings file. In some other implementations, the support services for the account may further provide a GUI that displays timelines for the virtual servers that graphically indicate the operating states of the virtual servers. In some embodiments, the support services for an account provide a GUI having a mechanism for an authorized user of the account to select options for reporting use of the respective set of virtual servers. The support services for the first account also monitor use of the respective set of virtual servers and generate reports, according to the selected options, for use of the respective set of virtual servers. In some embodiments, the plurality of computing servers and/or the processing circuit is configured to provide a GUI for selecting support services to be provided for each account and/or adjusting configuration settings for the selected support services in the settings file for the account. Example support services are described in more detail in connection with FIGS. 4-9 in the following examples.

The disclosed embodiments are applicable to various different types of computing servers including physical and/or virtual servers, which may provide various remote services including, for example, file servers, email servers, web hosting, virtual meeting services (e.g., VoIP), billing, and/or remote computing services (e.g., virtual desktops, virtual private servers, and/or virtual enterprise services). While the disclosed embodiments are not necessarily limited to such applications, various aspects of the present disclosure may be appreciated through a discussion of various examples in this context.

Turning now to the figures, FIG. 1 shows a communication network including a computing server cloud 140 having a plurality of computing servers (142, 144 and 146) configured to provide respective virtual data centers 162 and 164 for a plurality of accounts. The virtual data centers 162 and 164 may be accessed by various end-point devices including, for example, mobile devices 120, plain-old telephones (POTS) 122, computer(s) 126, and IP phones 128. For each account, the computing servers (142, 144 and 146) provide a respective virtual data center. The virtual data center includes various virtual servers and/or virtual desktops configured according to virtual server settings 152 in a respective settings file 150 for the account. In this example, the settings file 150 for each account is stored in a data storage 148 communicatively coupled to the computing server cloud 140. The virtual servers and/or virtual desktops are connected according to network layout and connections also specified in the respective settings file 150 for the account.

In this example, a first computing server 142 is configured to provide a virtual data center 162 for a first account. Second and third computing servers 144 and 146 provide a virtual data center 164 for a different account. The computing servers may include various computing/networking resources. For instance, in this example, the first computing server 142 includes a connection to public service telephone network (PSTN) 102 which may be used to emulate a virtual VoIP server in the virtual data center 162. Data transactions related to the remote services provided by the virtual data centers 162 and 164 may be communicated between the computing servers and the remote users over various data networks including, for example, the Internet 112, PSTN 102, wireless networks 104 (e.g., GSM, CDMA, or LTE), and private data networks, including, but not limited to LAN 130, WiFi network 124, and/or Private Branch Exchange servers (not shown).

A processing circuit 170 is communicatively coupled to the computing server cloud 140 and the data storage 148. The processing circuit 170 is configured to provide, for each of the accounts, a respective set of support services specified in support services settings 154 the settings file 150 for the account. As previously indicated, and described in more detail in connection with FIGS. 4-9 in the following examples, the support services for each account may include various services that supplement the virtual services provided by the virtual data center of the account.

Figure 2:
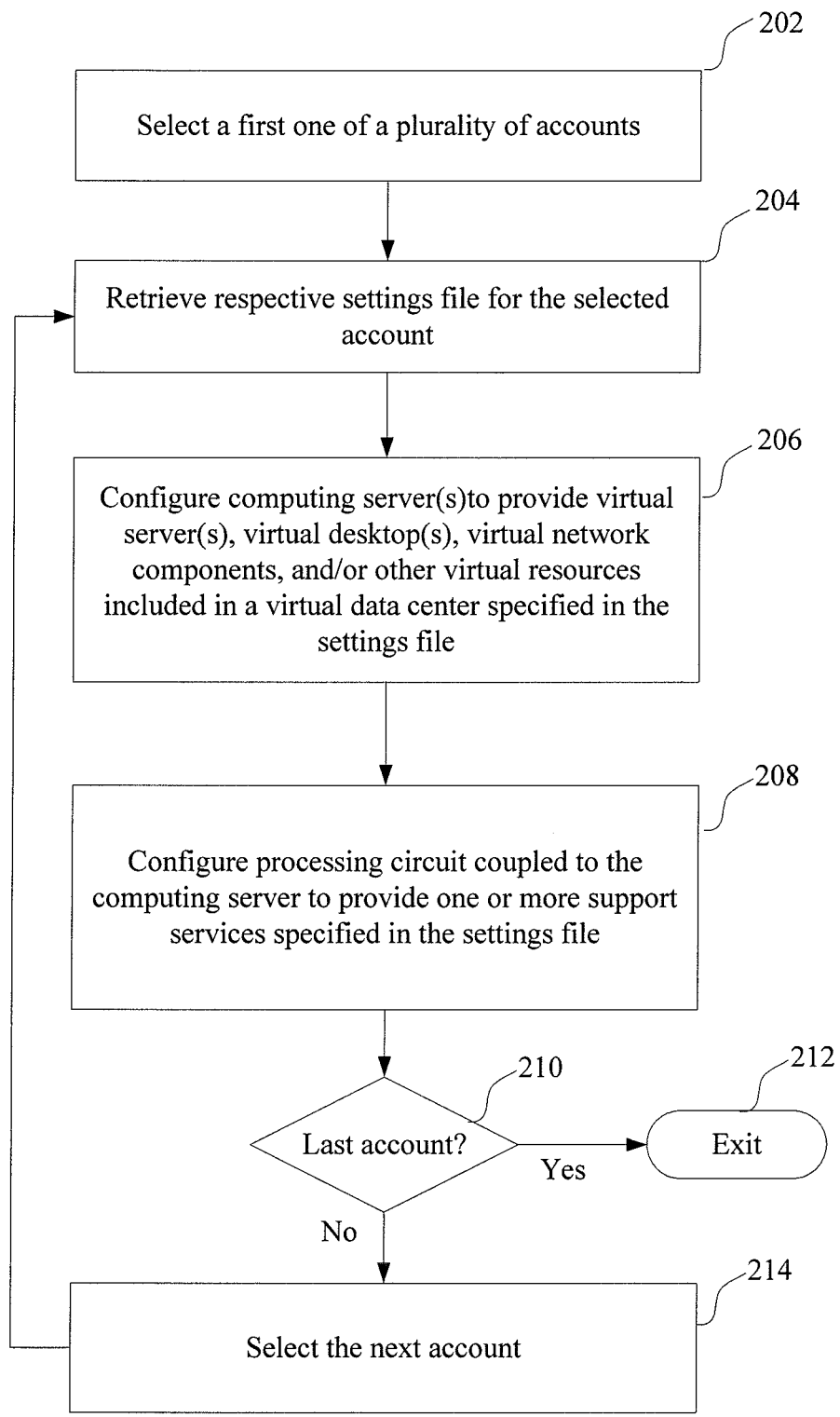
FIG. 2 shows a process for providing respective virtual data centers and support services for a plurality of accounts, in accordance with one or more embodiments.

FIG. 2 shows a process for providing respective virtual data centers and support services for a plurality of accounts. At block 202, a first one of the accounts is selected. At block 204, a respective settings file for the selected account is retrieved. At block 206, a set of computing server(s) are configured to provide virtual server(s), virtual desktop(s), virtual network components, and/or other virtual resources included in a virtual data center specified in the retrieved settings file. At block 208, a processing circuit coupled to the computing server(s) is configured to provide one or more support services specified indicated in the retrieved settings file. If the selected account is the last one of the plurality of accounts, decision block 210 directs the process exit. Otherwise, the process selects the next account at block 214 and restarts the process at block 204. The process is repeated in this manner until the last account is selected when the encounters decision block 210.

Figure 3:
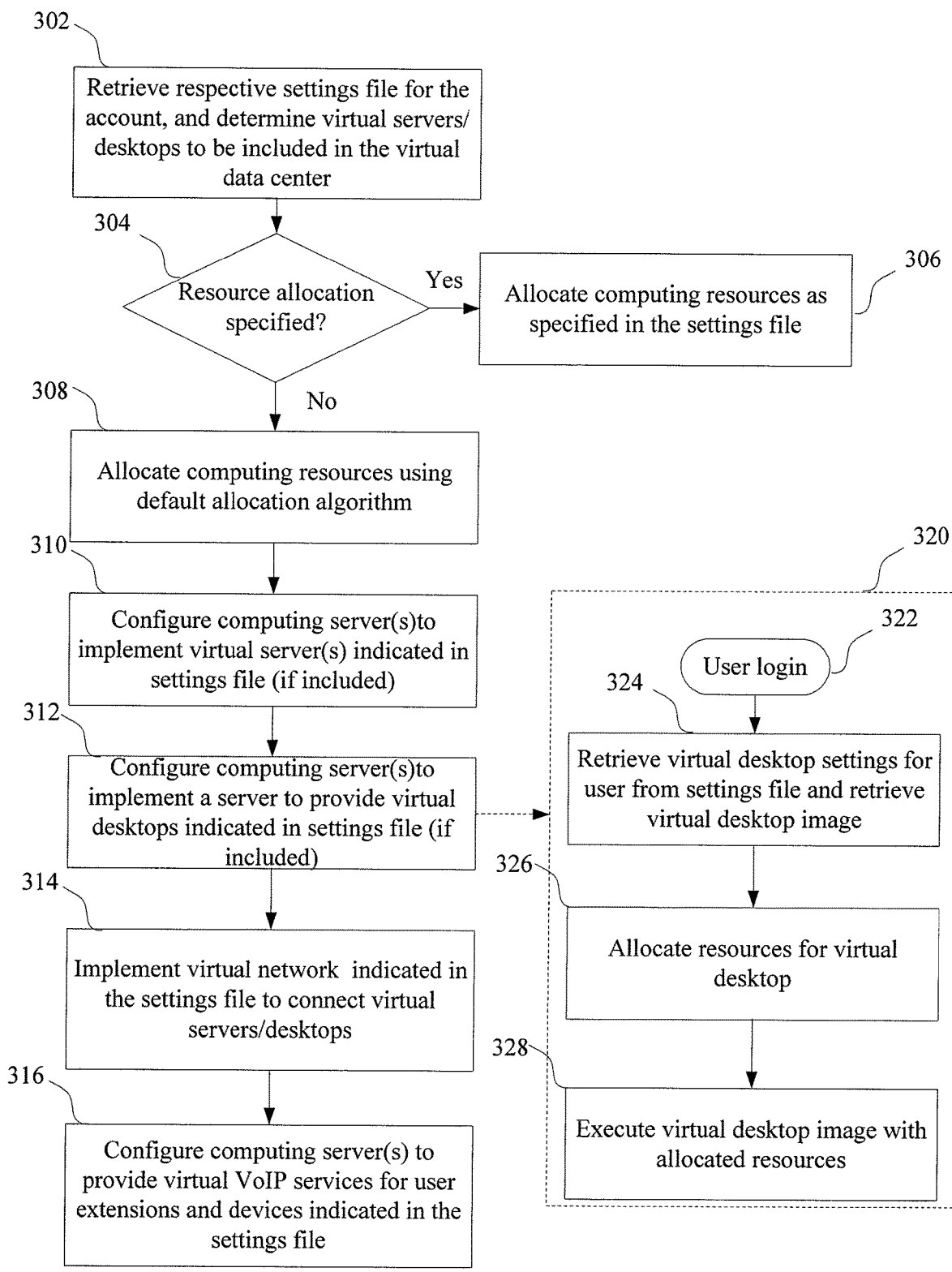
FIG. 3 shows a process for providing a virtual data center for one of a plurality of account.

FIG. 3 shows a process for providing a virtual data center for one of a plurality of accounts. At block 302, a respective settings for the account is retrieved and virtual servers/desktops to be included in the virtual data center are determined. Computing resources are allocated to implement the virtual servers/desktops at blocks 306 or 308. The computing resources may include, for example, processing resources (e.g., processing cores and processing time), memory resources, data storage resources, and/or network resources. In some implementations, an allocation of computing resources may be specified in the settings file for an account. In this example, if a resource allocation is not specified in the retrieved setting, decision block 304 directs the process to allocate computing resources using a default allocation algorithm at block 308. Otherwise, decision block 304 directs the process to allocate computing resources as specified in the settings file at block 306. The allocation specified in the settings file may be a fixed allocation (e.g., an allocation table) or may be an allocation function that allocates resources based on various criteria such as processing load, number of users, and/or priority of the virtual services. For instance, an allocation function for an account may be configured to prioritize allocation of network resources for VoIP services, in which network latency is less noticeable by users, in comparison to some other network services.

If one or more virtual servers are indicated in the settings file, a set of computing servers are configured at block 310 to implement the virtual servers with the resources allocated for the virtual servers. If virtual desktops are indicated in the settings, the computing servers are configured at block 312 to implement a server with the allocated resources to provide the virtual desktops. For example, the server may be configured to provide respective virtual desktops for remote employees in a virtual office. Block 320 shows an example sub-process that may be performed by the server to implement virtual desktops for a plurality of users. In response to a user login 322, virtual desktop settings for the user are retrieved from the settings file at block 324. A virtual desktop image corresponding to the user is also retrieved at block 324. At block 326, resources are allocated/reallocated by the sub-process 320 for the virtual desktop. The virtual desktop image is executed with the allocated resources at block 328 to provide the virtual desktop to the user.

At block 314, the computing servers are configured to implement a virtual network indicated in the settings file. The virtual network includes network connections to connect the virtual desktops and virtual servers in a network. The virtual network may also include various network devices or channels, such as routers, firewalls, and/or virtual private network (VPN) channels, which are configured according to network configuration settings provided in the settings file. At block 316, computing servers are configured to implement a VoIP server configured to provide VoIP services for user extensions and devices indicated in the settings file. For example, the VoIP server may be configured to implement a virtual private branch exchange (PBX) server to route incoming and outgoing calls to and from remote employees in a virtual office.

As previously indicated, the respective settings file for each account may be set to cause the processing circuit provide various support services, which complement the virtual servers, virtual desktops or other virtual resources included in the virtual data center provided for the account. For example, in some embodiments the support services provided for an account may include a DNS configured to dynamically map a respective set of domain names to network addresses of one or more virtual servers included in the virtual data center for the account according to a mapping function indicated in the settings file of the account.

For each account, the mapping function may map domain names to IP addresses of the virtual servers using various mapping criteria. For example, in some implementations, the mapping function may cause the DNS to map domain names based on the operating status of the virtual servers. For instance, the mapping function may map a domain name to a first virtual server while the first virtual server is operating correctly. In response to the first server going down, the mapping function may map the domain name to a backup virtual server. As another example, the mapping function may cause the DNS to map domain names based on processing load of the virtual servers. For instance, domain names may be mapped to balance processing load between a plurality of virtual servers. For example, the virtual servers provided for an account may be configured to provide one or more VoIP based services. The mapping function for the account may be configured to balance VoIP traffic evenly across the virtual servers for the account. In some implementations, the mapping function may cause the DNS to map domain names based on the geographical location of the user submitting a domain name query to the DNS.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective mapping function may be used for each account. This allows the mapping of domain names to be customized for the particular needs and services of each account. In some implementations, the support services are further configured to provide a web-based graphical user interface (GUI) configured and arranged to allow one or more authorized users of the account to adjust the mapping criteria indicated in the settings file. An authorized user may specify a single mapping function for all virtual servers associated with the account or may specify a different mapping functions for different types of virtual servers or for different virtual servers of the same type. Further, an authorized user may specify different mapping functions for different departments or users associated with an account.

Figure 4:
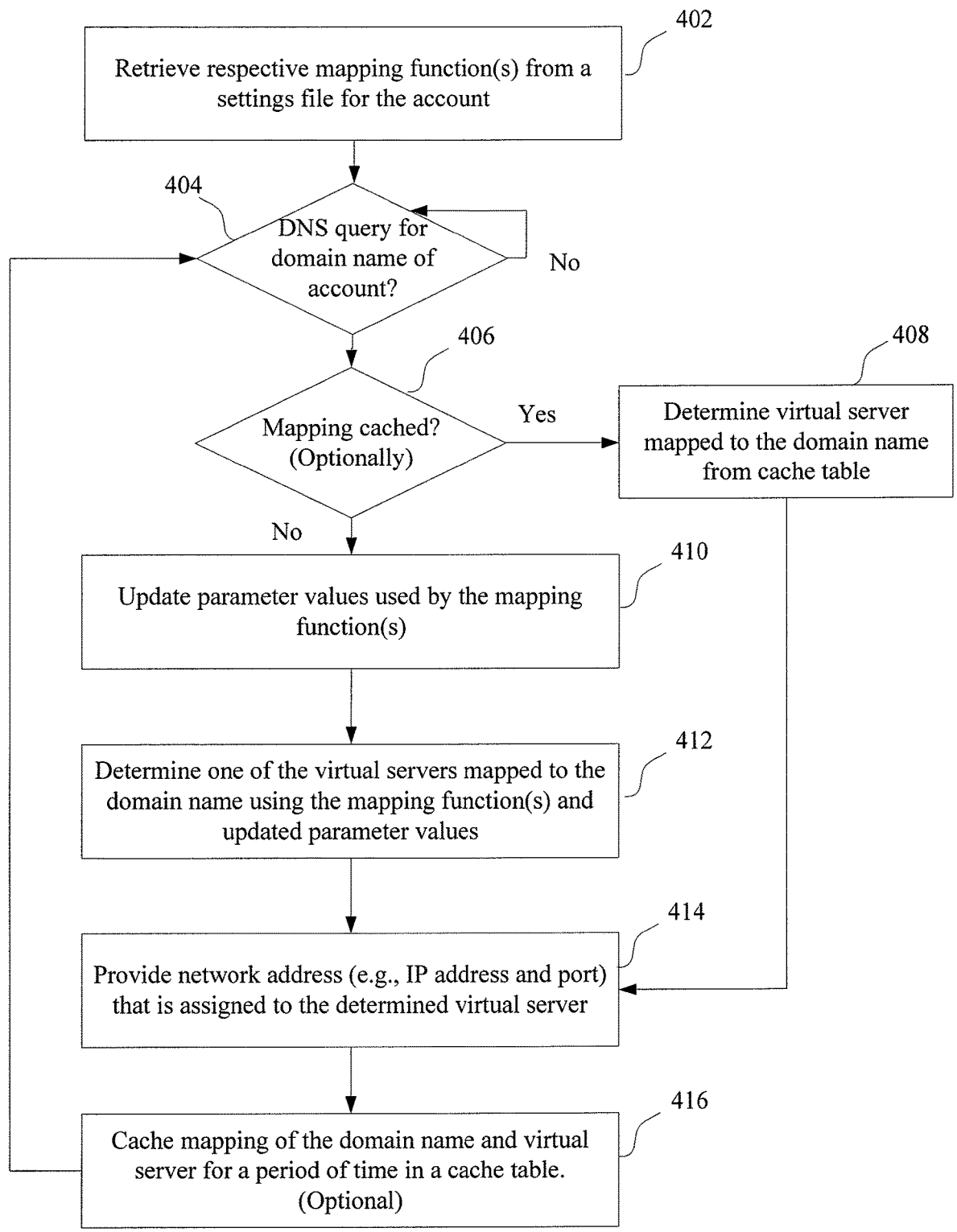
FIG. 4 shows a process for dynamic mapping of domain names, in accordance with one or more embodiments.

FIG. 4 shows an example process for dynamic mapping of a set of domain names for an account, in accordance with one or more embodiments. At block 402, one or more respective mapping functions are retrieved (e.g., from a respective settings for the account). The process waits at decision block 404, until a DNS query is received for one of the domain names of the account. In response to a DNS query for one of the domain names of the account, the process checks to see if a mapping for the domain name is cached from a recent DNS query. If so, decision block 406 causes the process to determine the virtual server of the account that is mapped to the domain name from a cache table at block 408.

Otherwise, decision block 406 directs the process to block 410. At block 410, the process updates parameter values used by the mapping function(s) of the account. The parameters may include for example, operating status of the virtual servers, processing load of the virtual servers, load distribution, geographic location of the user that submitted the DNS query, time of the DNS query, etc. At block 412, a virtual server of the account that is mapped to the domain name is dynamically determined using the mapping function(s) and the updated parameters.

After determining a virtual server mapped to the domain name at block 408 or 412, a network address of the determined virtual server is provided, at block 414, to the user that submitted the DNS query. After providing the network address to the user the process returns to decision block 404 and waits for another DNS query. Optionally, prior to returning to decision block 404, a mapping of the domain name and virtual server may be cached, at block 416, for a period of time in a cache table.

In some various embodiments, the support services provided for an account may monitor an operating state of each of a set of virtual servers provided for the account and generate alerts based on the monitored operating states. More specifically, the support services for the account may be configured to generate alerts to a user indicated in the settings file for the account in response to the operating state of the one or more virtual servers satisfying alert criteria specified in an alert policy stored in the settings file for the account.

The alert policy for an account may include respective sets of alert criteria for different virtual servers. The alert criteria in the alert policy of an account may be specified as a function of various operating conditions of a virtual server. Some various conditions that may be used to trigger provision of an alert message include, but are not limited to, an operating state of the virtual server, processing load of the virtual server, memory usage of the virtual server, response time/latency of the virtual server, current number of users and/or quality of service.

Alert messages may be provided using a number of different types of messages. For instance, in some implementations the processing circuit is configured to provide an SMS text message notification to one or more telephone numbers indicated in the alert policy. In some implementations, the processing circuit is configured to send an automated voice call to the telephone number(s). In some embodiments, the processing circuit is configured to send an email notification to an email address indicated in the alert policy. In some embodiments, alert messages are provided using other messaging services (e.g., Facebook, MySpace, Twitter, and/or Instant Messengers). In some implementations, multiple notifications are sent to multiple recipients and/or use multiple types of messages.

In some implementations, alert messages may be provided in real time as alert criteria are satisfied. Some other implementations may avoid generating an overly burdensome number of notifications by filtering notifications based on the frequency or number of the notifications. For example, one implementation limits generation of alert messages to a maximum frequency (e.g., one per hour) that is specified in the alert policy. Each alert message may summarize all instances of unauthorized access and/or system problems that have occurred since the last alert message was sent. As another example, some embodiments limit the number of alerts generated per day to a number indicated in the alert policy.

In some implementations, the support services provided by the processing circuit may be further configured to perform a set of actions listed in the alert policy, in response to the alert criteria for a virtual server being satisfied. In some implementations, an authorized user may be prompted to select an appropriate action to be taken. In some implementations, the alert message that is sent to an authorized user is configured to provide a mechanism for the user to select from one or more possible actions. For instance, in one implementation, an email or SMS text message may include a web address link to a webpage from which a user may select an action to take. In another implementation, a user may select a desired action by responding to an SMS text message with a text message indicating the selected action.

The settings of an alert policy (e.g., alert criteria for trigging alert messages, message options, users to alert and/or additional actions to take in response to the criteria being satisfied) may be adjusted based on the requirements of the virtual servers that are monitored. In some embodiments, the processing circuit is configured to provide a GUI that may be used to adjust settings of the alert policy.

Figure 5:
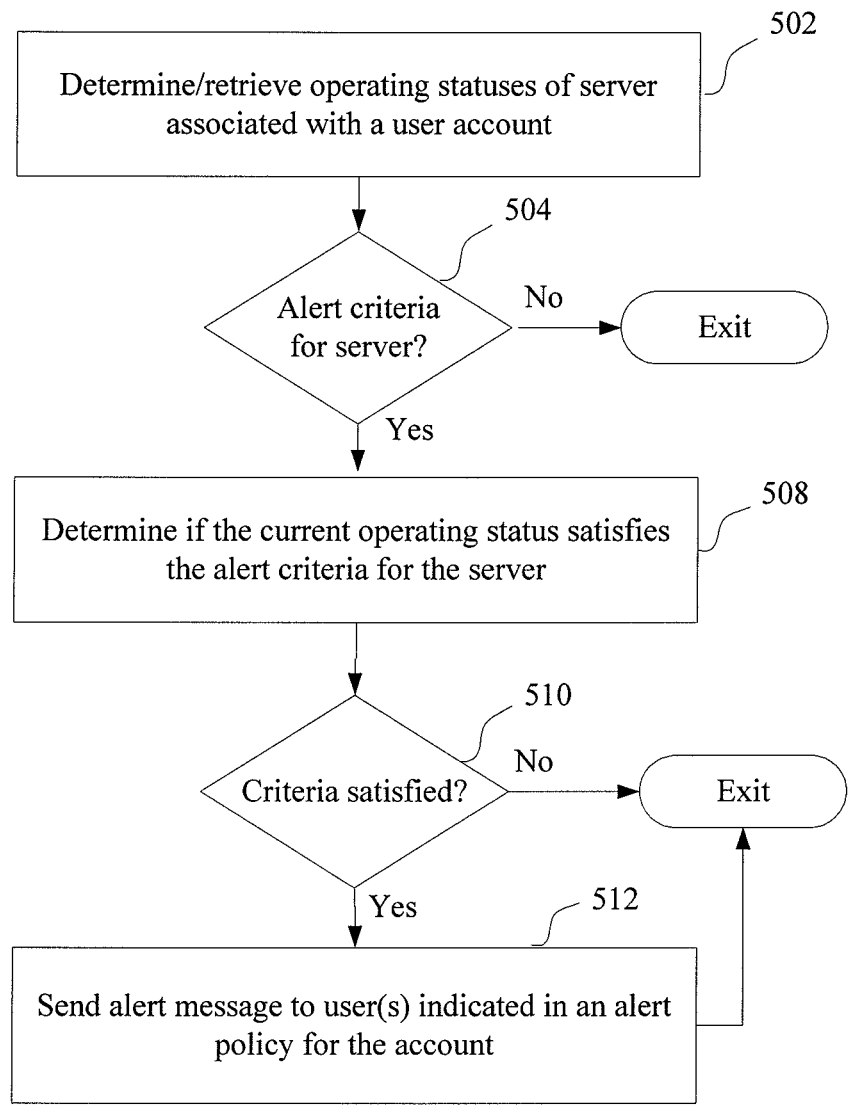
FIG. 5 shows an example process for monitoring the operating status of a computing server, in accordance with one or more embodiments of the present disclosure.

FIG. 5 shows an example process for monitoring the operating status of a virtual server, in accordance with one or more embodiments of the present disclosure. An operating status of a virtual server of a user account is determined or retrieved at block 502. If no alert criteria is specified for the virtual server in an alert policy of the account, decision block 504 directs the process to exit. Otherwise, at block 508, the process determines whether or not the current operating status of the virtual server satisfies the alert criteria for the virtual server. If the criteria is not satisfied decision block 510, the process exits. Otherwise, at block 512 an alert message is sent to one or more users indicated in the alert policy of the account.

In some implementations, the process automatically performs one or more actions specified in the alert policy, in response to the alert criteria being satisfied. For example, if the satisfied criteria indicate that a virtual server is down, the alert policy may prompt the process to automatically take some remedial actions including, for example, resetting the virtual server or switching to a backup server. In some embodiments, the process may prompt an authorized user to select from a set of possible actions, in response to the alert criteria being satisfied.

Figure 6:
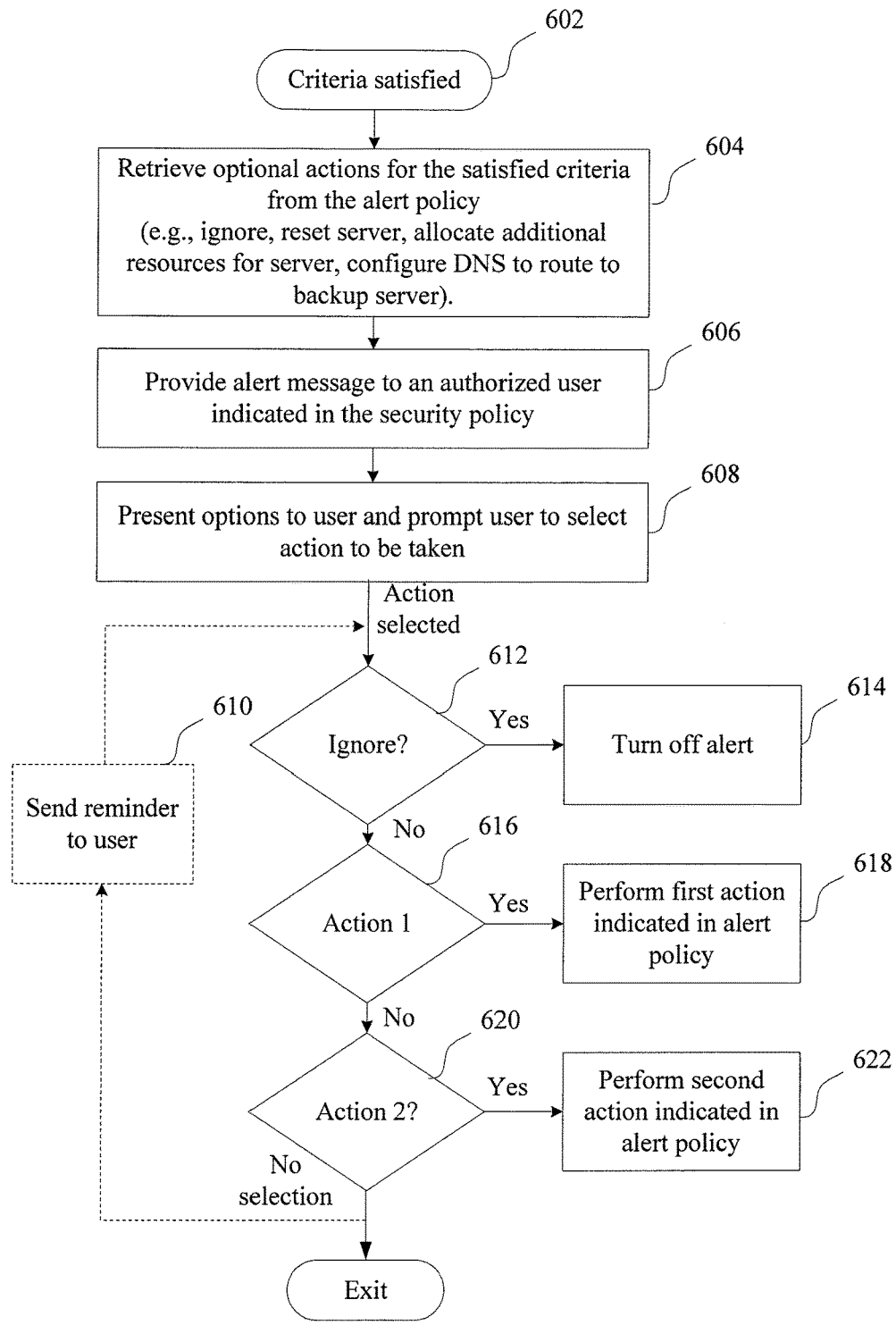
FIG. 6 shows an example process for providing an alert to an authorized user and prompting the user to select from a list of possible actions, in accordance with one or more embodiments of the present disclosure.

FIG. 6 shows an example process for providing an alert to an authorized user of an account and prompting the user to select a desired action, in accordance with one or more embodiments of the present disclosure. In response to alert criteria of a virtual server being satisfied at block 602, optional actions for the satisfied criteria are retrieved from the alert policy at block 604. At block 606, an alert message is provided to an authorized user indicated in the alert policy.

The options are presented to the user and the user is prompted to select an action to be taken at block 608. For example, in some embodiments, the alert message provided to a user at block 606 may indicate the options and provide a mechanism for the user to select an action to be taken. For instance, in one implementation, options are presented in a text message and the desired action is selected by replying to the text message with one of a plurality of designated responses. In another implementation, a link to a web-accessible GUI may be provided for the user to select from the set of actions.

The alert criteria may specify various possible actions that may be presented to the user. For instance, in one possible configuration of an alert policy, a user may ignore an alert, reset a virtual server, allocate additional server resources, and/or switch to a backup server. In the example shown in FIG. 6, a user is presented with three options (ignore, action 1, or action 2). If the ignore option is selected by a user, at decision block 612, the alert is turned off at block 614 and the process exits. If action 1 is selected by a user, at decision block 616, a first action indicated in the alert policy is performed at block 618. Similarly, if action 2 is selected by a user, at decision block 620, a second action indicated in the alert policy is performed at block 622. If no action is selected by a user, the process exits. In some implementations, if a user does not select an action within a specified amount of time, a reminder is sent to a user at block 610.

In some embodiments, the support services for an account is configured to monitor an operating state of the virtual servers provided for the account and provide a web-based GUI configured to display a respective timeline, indicating operating status for each virtual server provided for the account. For example, the processing circuit may determine an operating state of each virtual server for a plurality of time periods, the processing circuit. In some implementations, the determined operating state may be one of three states including an "up" state, a "warning" state, and a "down" state. Each of the timelines has a respective time block for each of a plurality of time periods. Each time block has a graphical indication of one of the three states of operation corresponding to the operating state of the virtual server at the corresponding time period.

The processing circuit may use various criteria to determine whether a virtual server is operating in the various operating states. In some implementations, a virtual server is determined to be in the up state when the virtual server is fully operational and in the down state when the virtual server is non-responsive. The virtual server may be determined to be in the warning state when the virtual server is responsive, but exhibits one or more indications of incorrect operation or excessive load. As one example, a virtual server may be identified by the processing circuit as operating in the warning state if a traffic load on the virtual server exceeds a threshold value. As another example, a virtual server may be identified as operating in the warning state if latency of the virtual server exceeds a threshold value. As yet another example, a virtual server may be identified as operating in the warning state if processing time or memory usage of the virtual server exceeds a threshold value. Other criteria may additionally or alternatively be used.

Some implementations may use more or fewer operating states to categorize the operating states of a virtual server. For example, multiple warning states may be used in addition to the up and down states. The different warning states may indicate the severity, number, or frequency of the indication(s) that the virtual server is not operating correctly. For ease of explanation, the examples are primarily described with reference to the three operating states indicated above (i.e., up, warning, and down).

In some implementations, each time block of a timeline has a graphical indication that describes the operating state of a corresponding virtual server during the corresponding time period. In some implementations, the time blocks are color-coded, with a respective color for each of the possible states of operation. In some implementations, the time blocks are texture-coded, with a respective texture for each of the three states of operation. Other types of markers, such as icons, may also be used to provide a visual indication of the operating state at each time block in the timelines.

In some implementations, the timelines of the different virtual servers are vertically aligned, such that time blocks associated with the different virtual servers and that correspond to the same time period are vertically aligned. Such alignment may allow timelines to be visually compared/analyzed to distinguish between network-side events affecting multiple virtual servers, server-side events affecting only a single virtual server, or user-side events affecting a single user.

In some embodiments, the GUI includes a mechanism that allows a user to modify the order and/or vertical placement of the timelines in the list. For instance, the GUI may be configured to allow a user to reorder the timelines using a drag-and-drop control. Reordering of timelines may be helpful to allow a user to more closely compare the timelines of two or more virtual servers. In some embodiments, the GUI is configured to mark ones of the timelines with a graphical marker in response to the timeline being selected by a user. For instance, in some implementations, the graphical marker may be an image of a push pin. The GUI may display the marked/pinned timelines in a separate area of the display. For instance, marked/pinned timelines may be displayed in a first display area and other ones of the timelines in a second display area.

In some embodiments, the GUI is configured to allow a user to save various arrangements/orders of the timelines. This may allow a user to quickly compare the same virtual servers at a later time without having to repeat the previous rearrangement/ordering operations performed by the user. In some implementations, the GUI includes a first button to save an arrangement/order, a second button to restore the original arrangement/order, and/or a third button to load a previously saved arrangement/order.

The processing circuit that provides the GUI may also be configured to monitor the virtual servers and/or determine the operating states of virtual servers. In some implementations, the operating states of the virtual servers may be determined by a separate processing circuit, such as a network monitor. In some implementations, the virtual servers may be configured to determine their operating state and provide the determined operating state data to the GUI.

As indicated above, various criteria may be used to determine the state in which a virtual server is operating. In some embodiments, a single criterion may be used to determine the operating states of the virtual servers. In some other embodiments, the operating state of each of the virtual servers may be determined according to a respective set of criteria indicated in an account settings file associated with a customer account. The sets of criteria may be configured, based on user requirements, to include a number of different conditions to detect various operating states. In some embodiments, the apparatus may provide a web-based GUI that may be used to adjust the criteria indicated in the settings file.

Figure 7A:
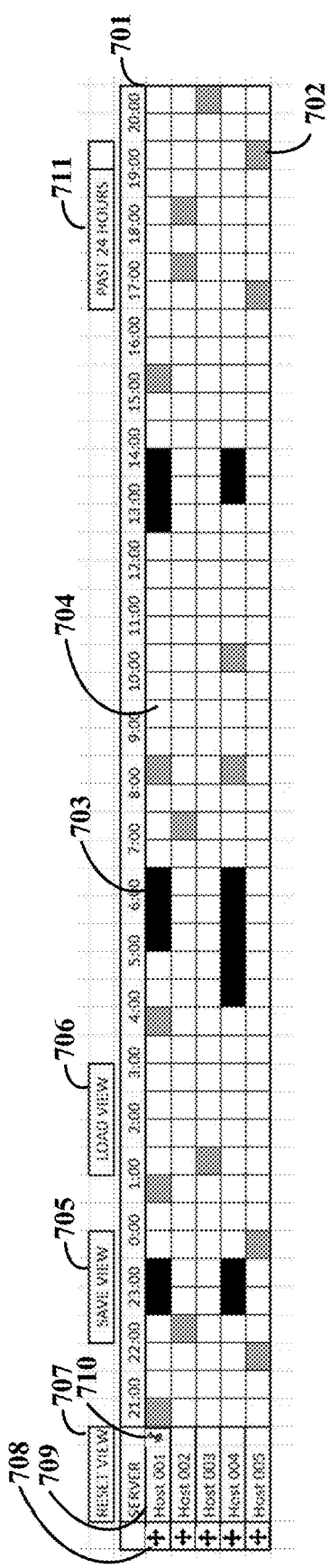
FIG. 7A shows a first GUI, in accordance with one or more embodiments.

FIG. 7A shows a first graphical user interface (GUI), in accordance with one or more implementations. The GUI includes a main/primary container 701 for the simultaneous display of operating state timelines of multiple servers. Each timeline includes a set of time blocks in a respective row. As explained above, each time block includes a graphical indication of the operating status of the server for the corresponding time period. In this example, the time blocks indicate one of three possible operating states: up, warning, and down. Time block 702 shows a time block having a color/pattern (lined) indicative of the warning state. Time block 703 shows a time block having a color/pattern (solid black) indicative of the down state. Time block 704 shows a time block having a color/pattern (solid white) indicative of the up state. The color/pattern coding in this example is provided for explanation purposes only. The examples and embodiments may be adapted to use other color/pattern codings to indicate the various possible operation states of the servers. In this example, each timeline is preceded by a title cell 709 indicating the name of the server whose status is displayed in the timeline.

In this example, the GUI includes a time-scale configurator dropdown 711 that can be used to select different timescales (e.g., 1 hour, 24 hours, 1 week, 1 month) to display. The time-series data will go through a map-reduce algorithm and the reference header time labels will change to resize the time blocks, corresponding to the selected time period, for display.

The GUI includes a clickable/dragable handle 708 for each row that may be used by a user to reorder the displayed timelines, via a drag-and-drop mechanism. Sorting rows makes it possible for a network operator to see correlation visually across a very large set of aligned time series data.

The GUI includes a set of buttons for saving, restoring, and resetting the arrangement/view of the timelines in the displayed list of timelines. In some implementations, the GUI includes a clickable button 705, which invokes a drop down dialog allowing the user to name the current arrangement/view and save it for later use. The GUI also includes a second clickable button 706, which invokes a drop down for selecting and opening a saved arrangement/view selection. In this example, the GUI also includes a clickable button 707 that resets the view back to the original order and scale.

In some implementation, the GUI is also configured to mark title cells 709 that are selected by a user. For instance, when the user hovers over a title cell, the color changes slightly and a clickable push pin icon 710 appears in the cell. When the push pin icon 710 is clicked, this row will be moved to the top of the list of timelines.

Figure 7B:
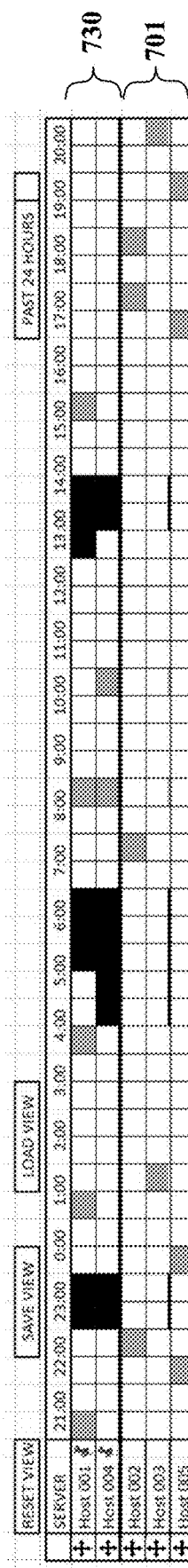
FIG. 7B shows a second GUI, in accordance with one or more embodiments.

FIG. 7B shows a second graphical GUI, in accordance with one or more implementations. The second GUI is similar to the GUI shown in FIG. 7A but includes a second display area 730 for display of timelines selected by clicking the push pin icon 710 discussed with reference to FIG. 7A. The display area 730 always appears at the top of the table and expands as additional timelines are selected. In some implementations, as the user scrolls down the page, the display area 730 remains at the top of the browser window, so that the user can quickly compare the pinned timelines in area 730 to timelines in the original set. When a timeline is selected/pinned, it may be hidden from the original set displayed in a second area below area 730. A timeline may be added back to the original set when it is unpinned by a user again clicking on the push pin icon 710. The user can sort the items inside the pinned set.

According to another example embodiment, the support services provided for an account by the processing circuit include a GUI having a mechanism for an authorized user of the account to select options for reporting use of the respective set of virtual servers. In some implementations, the support services provide a GUI having a mechanism for an authorized user of the account to select options for reporting use of the respective set of virtual servers. In some implementations, the GUI may also include a mechanism for the authorized user to select and/or configure the set of virtual servers to be provided for the account. As an example, the GUI may provide an interface for the authorized user to add/remove users or third-party customers for the account, configure virtual servers to be provided for each user or third-party customer, and/or configure reporting options for use of the virtual servers by each of the users or third-party customers. The GUI may further be configured to adjust reporting options and generate usage and/or expense reports for each account, user and/or third-party customers according to service rates in the reporting options. Service rates may be specified as a fixed fee for a reporting period or may be specified as a function of an amount of usage (e.g., processing time, resource usage and/or bandwidth usage).

The processing circuit is further configured to monitor use of the respective set of virtual servers and generate reports, according to the selected options, for use of the respective set of virtual servers. In some implementations, the processing circuit monitors usage of the virtual servers by users or third-party customers and generates reports for use of the virtual servers according to the reporting options selected by the authorized user. For example, the authorized user may create and configure an account to provide respective virtual servers for various company departments of a company and configure reporting options to generate a single usage report for all virtual servers provided for the company. The single usage report may include, for example, expenses for usage of the virtual servers—thereby allowing the company to assess use of the virtual servers for a single report. In some instances, the reporting options may be configured to cause the processing circuit to additionally or alternatively generate individual reports for individual users or groups of users (e.g., departments). The individual reports may be used, for example, for internal tracking of expenses within the company. In some instances, an owner of an account may use the virtual servers to provide services to third party customers. Reporting options may be set to generate a respective usage and/or expense report for each third-party customer based on use of the services by the third-party customer and service rates set by the authorized user.

Figure 8:
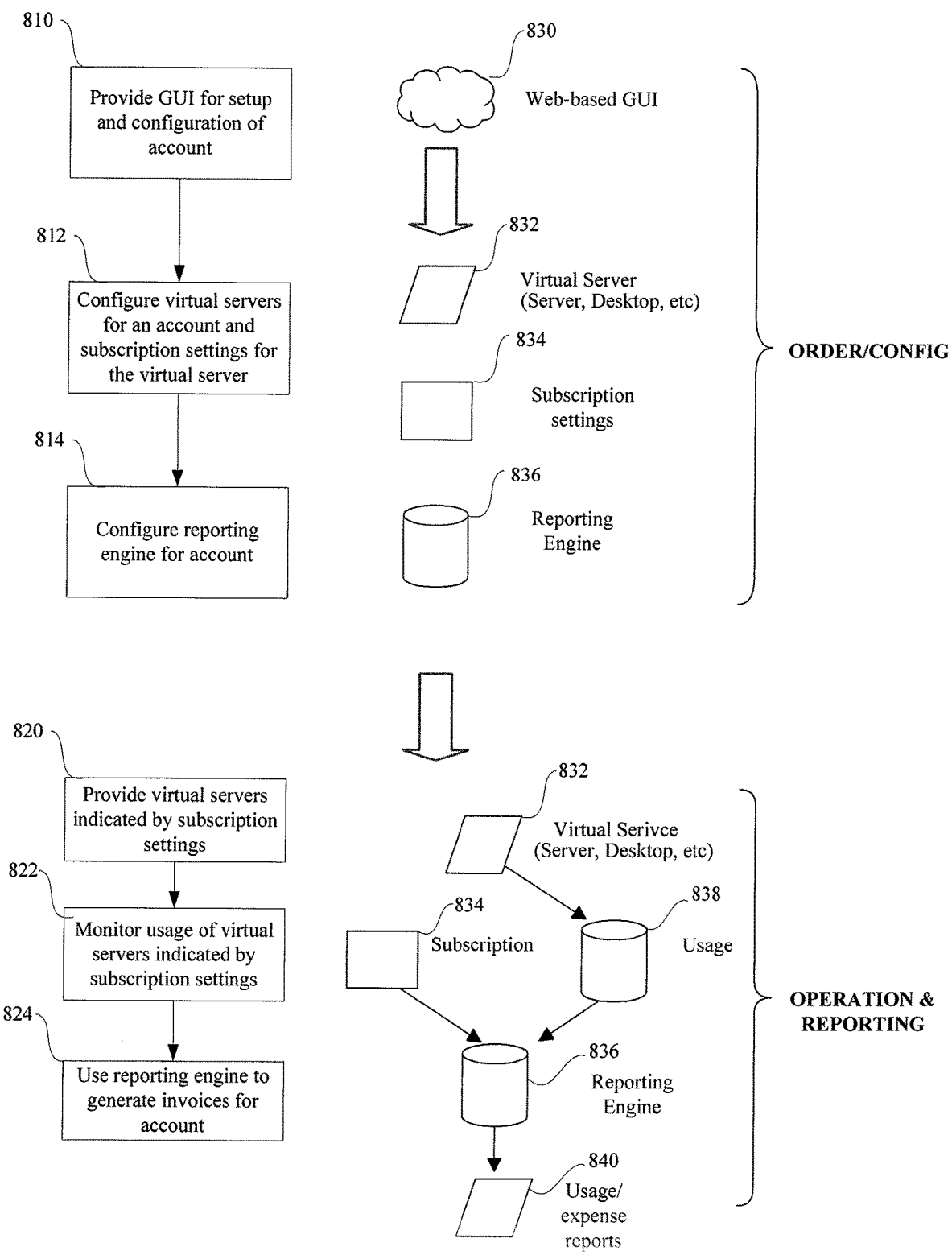
FIG. 8 shows an example flowchart for configuration, operation, and reporting for virtual servers for an account, in accordance with one or more embodiments.

FIG. 8 shows an example flowchart for configuration, operation, and usage/expense reporting for virtual servers for an account, in accordance with one or more implementations. At block 810, a GUI is provided for setup and configuration of an account by an authorized user. The GUI may be, for example, a web-based GUI 830 accessible via a website. At block 812, one or more virtual servers 832 to be provided for the account are configured. Also at block 812, subscriptions settings 834 for use of the virtual servers are configured. The subscription settings 834 may specify various settings for account including, for example, users or third-party customers to be provided service by the individual virtual servers, user permissions, usage limits for the virtual servers 832 or users, service rates, and/or reporting options. At block 814, a reporting engine 836 for the account is configured. The reporting engine 836 generates reports for use of the virtual servers 832 according to service rates specified for the account, for example, in the subscriptions 834.

After setting up the server, subscription, and reporting, the virtual server(s) 832 are provided to the users or third-party customers at block 820. At block 822, usage of virtual servers indicated by the subscriptions 834 is monitored and logged, for example, in a usage database 838. At block 824, the reporting engine 836 is used to generate invoices 840 based on the usage 838 of the virtual servers 832 and the subscription settings 834 (e.g., service rates). The reporting engine 836 may generate an invoice for all virtual servers provided for the account or may generate invoices for individual virtual servers, users, or third-party customers.

Figure 9:
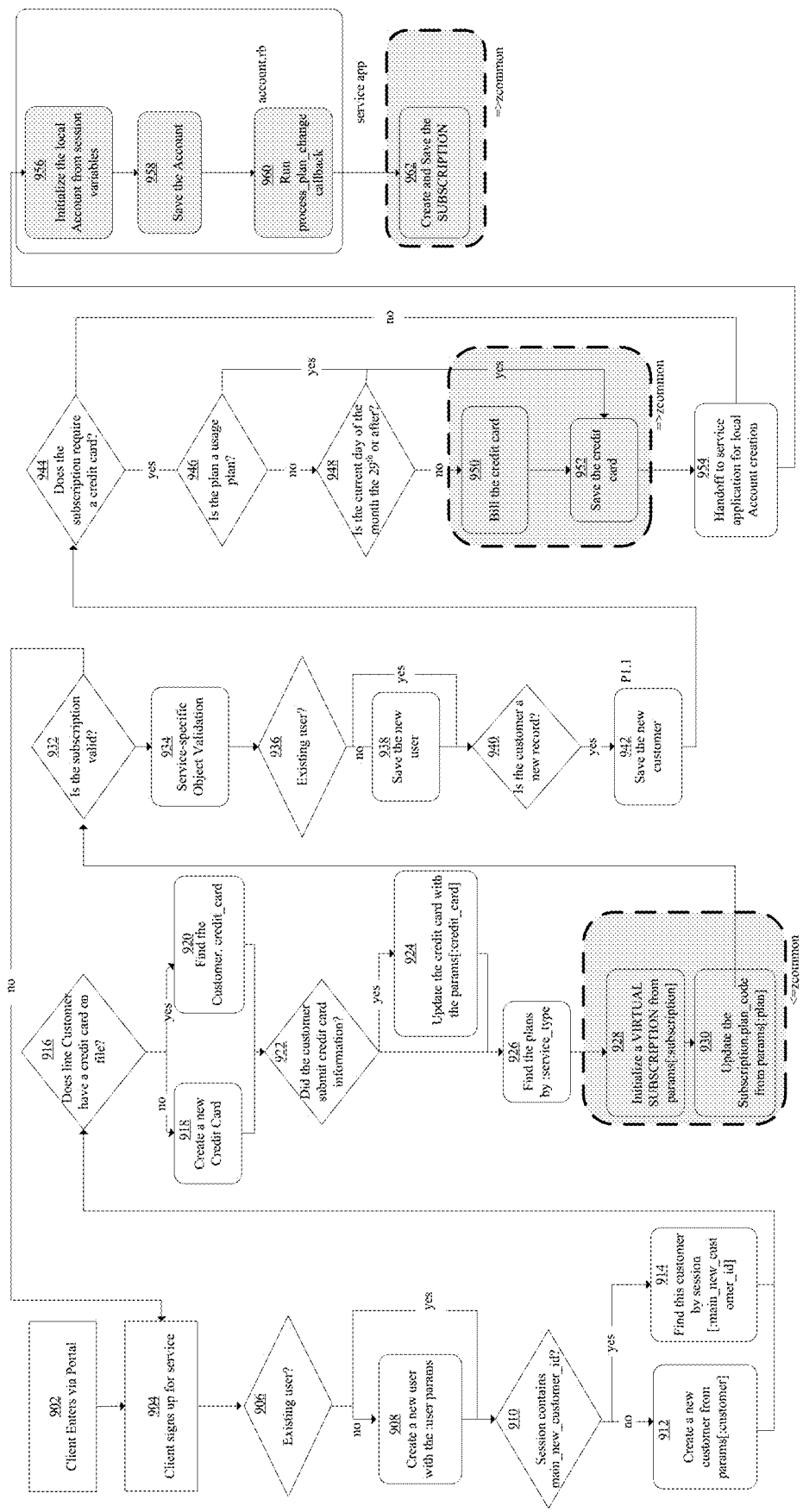
FIG. 9 shows a process for signup and configuration of an account, in accordance with one or more embodiments.

FIG. 9 shows a process for signup and configuration of an account, in accordance with one or more embodiments. At block 902 a customer enters the process via a portal (e.g., a web-accessible GUI or website). The customer signs up for service at block 904. If the customer is not an existing user at decision block 906, the process creates a new user with user parameters at block 908. Otherwise, the process continues to decision block 910. If the session contains a main_new_customer_id, the process finds the customer by the main_new_customer_id at block 914. Otherwise, a new customer is created at block 912. If the customer does not have a credit card on file at decision block 916, a new credit card is entered into the system at block 918. Otherwise, information for an existing credit card for the customer is located at block 920. If the customer submits credit card information, at decision block 922, the process updates the credit card information for the customer at block 924.

Plans for various service types requested by a user are located at block 926. A virtual subscription is initialized at block 928 and a subscription plan for the customer is updated at block 930. The virtual subscription is used to validate the subscription and bill the credit card for an initial amount. Reoccurring payments are setup later. If the subscription is valid at decision block 932, specific service object validation is performed at block 934. If the customer is not an existing user at decision block 936, a new user is created and saved at block 938.

If the customer is a new record, decision block 940 directs the process to save the new customer at block 942. If the subscription requires a credit card, credit card information is configured and stored for usage and/or expense reporting at blocks 944 through 952. If the plan is a usage plan, decision block 946 directs the process to save the credit card information at block 952 for later reporting. Otherwise, if the date is the beginning of a new reporting period, decision block 948 directs the process to bill the credit card at block 950 and save the credit card information at block 952. Creation of the account is initialized at block 954. The account is initialized using variables of the preceding session at block 956 and the account is saved at block 958. Maintenance processes may be run at block 960 to update plan changes. The subscription is created and saved at block 962.

Figure 10:
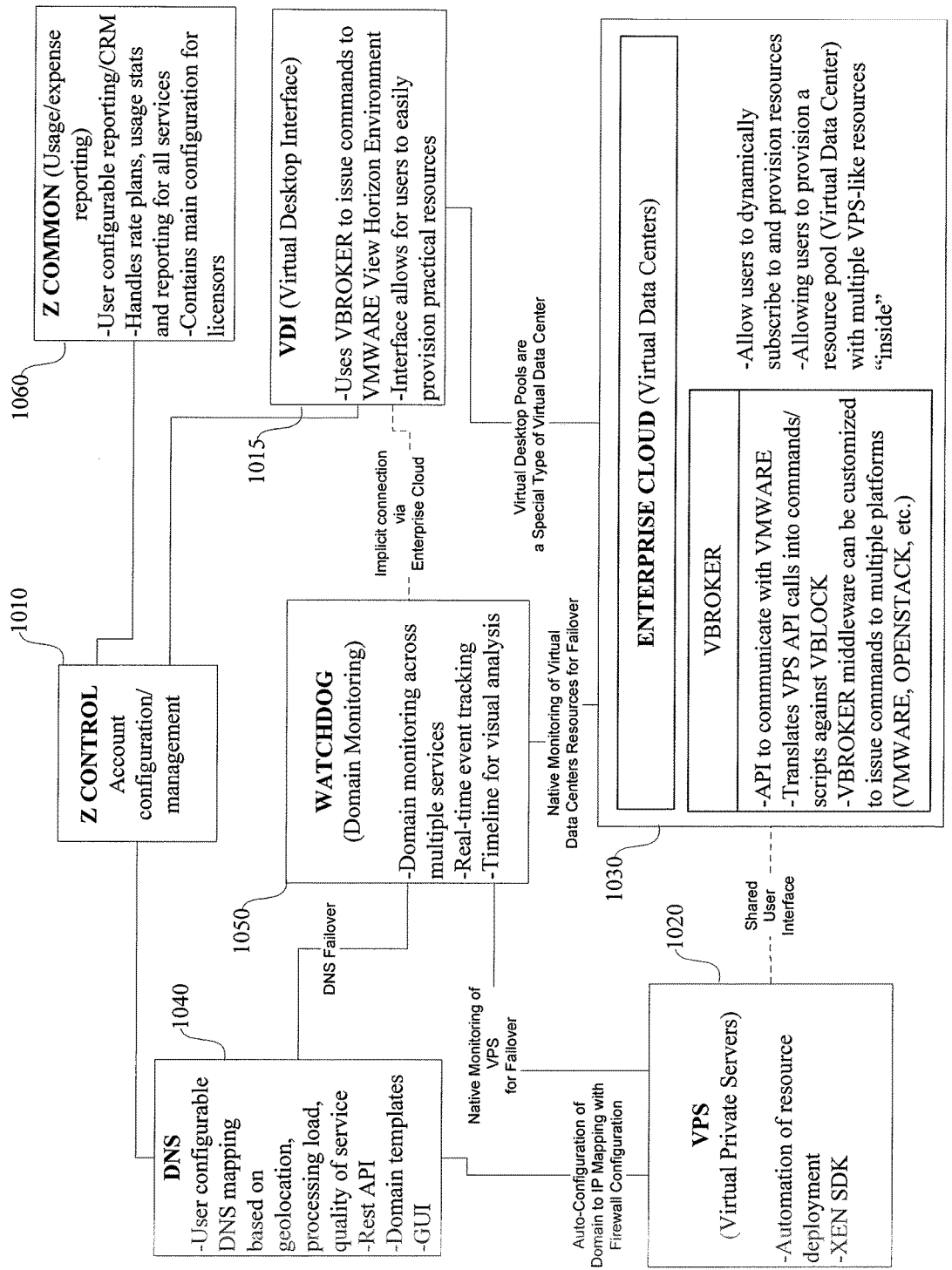
FIG. 10 shows a block diagram of an example system configured to provide respective groups of virtual servers for a number of accounts, in accordance with one or more embodiments.

FIG. 10 shows a block diagram of an example system configured to provide respective groups of virtual servers for a number of accounts, and provide customizable usage and/or expense reporting for each account. FIG. 10 shows various subsystems included in the example system (Z_system). The system includes multiple subsystems configured to provide respective virtual servers/services for various user accounts. For example, the system includes a first subsystem virtual desktop interface (VDI) 1015, which is configured to provide virtual desktops for accounts subscribing to the service. Virtual desktops allow end-users to remotely connect to and run applications on a virtual desktop computer. The VDI subsystem provides a non-technical interface for authorized end-users of an account to provision virtual resources. In some implementations, the VDI subsystem 1015 uses a subsystem VBROKER to issue commands to VMWARE View Horizon Environment. VBROKER is a full VMWARE view software development kit (SDK) that provides the ability to run custom Windows Powershell scripts against a VMWARE View Horizon Environment server in order to create, manage and synchronize information about desktop pool resources of the system. VBROKER may also be applicable to other subsystems shown in FIG. 10, as well as various other applications utilizing VMWARE.

The system also includes a second subsystem Virtual Private Servers (VPS) 1020, which can be configured to virtualize various servers for an account. In some implementations, the VPS subsystem 1020 automates deployment of resources allocated for an account. For instance, the VPS subsystem 1020 may provide various virtual servers/services including, but not limited to, file servers, email servers, web hosting, and virtual meeting services (e.g., VoIP), etc. In some scenarios, the VPS subsystem 1020 may be accessible by virtual desktops (via VDI), by external computers (via the internet), or both. In some implementations, the virtual servers/services provided by the VPS subsystem 1020 may be configured using a SDK such as XEN. The SDK may be used, for example, to customize and/or maintain virtual services provided by the VPS system for an account.

The system shown in FIG. 10 also includes a third subsystem (Enterprise Cloud) 1030 that is configured to provide a virtual data centers for an account. The Enterprise Cloud subsystem 1030 allows users to dynamically subscribe to provision resources (e.g., virtual servers/services). Users may create a virtual data center having a pool of resources, which may include a number of VPS-like servers/services. For each account, a respective virtual data center provided by the Enterprise Cloud 1030 may be configured to include a number of VPS and/or virtual desktops connected in any number of different configurations. For instance, a virtual data center may include a plurality of redundant virtual file servers and a virtual load balancer that routes traffic to balance traffic load of the virtual file servers. The virtual data center provided by the Enterprise Cloud 1030 may include a firewall between a network and the virtual data center. Additionally or alternatively the virtual data center may include firewalls to protect individual virtual servers/desktops in the virtual data center.

In some implementations, a virtual data center provided by the Enterprise Cloud 1030 for an account includes a group of virtual desktops and/or virtual servers indicated in respective settings files for the account. The virtual desktops and/or virtual servers in the virtual data center may be provided by the VDI and VPS subsystems 1015 and 1020 via a shared user interface. The settings file for each account may include server settings for each virtual desktop and/or virtual servers included in the respective virtual data center. The server settings may include a pointer to a VMWARE image and also specify computing resources to dedicate to execution of the corresponding virtual desktops and/or virtual servers. The virtual servers may provide various types of services including, for example, file servers, email servers, web hosting, virtual meeting services (e.g., VoIP), remote computing services, routing, load balancing, and/or switch board services (e.g., Private Branch Exchange).

The virtual desktops and/or virtual servers are interconnected in the virtual data center according to data center configuration settings included in the respective settings files for the account. During operation, computing servers of the Enterprise Cloud 1030 emulate the virtual data center by emulating the virtual desktops and/or virtual servers indicated in the server settings, and also emulating the virtual connections specified in the data center configuration settings. In some implementations, emulation of the virtual data centers in the Enterprise Cloud 1030 includes execution of a resource management process, configured to assign computing resources allocated for the virtual data center for emulation of the virtual desktops, virtual servers, and connections of the virtual data center.

In some implementations, a virtual data center provides a perimeter firewall between an internal network of the virtual data center and an external network. The perimeter firewall may provide network protection for the virtual data center with stateful packet inspection, access-control lists, network address translation (NAT), and virtual private network (VPN) connections. In some implementations, the virtual data center may also include individual firewalls isolating one or more virtual servers/desktops from other virtual servers/desktops in the virtual data center. In some implementations a web-based GUI is provided for configuration of access rules enforced by the firewall(s) which may include, for example, whitelists or blacklists of services to pass/block and/or users or IP addresses to allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN). In some implementations, the Enterprise Cloud subsystem 1030 uses VBROKER to issue commands to VMWARE hosting the virtual servers/desktops. VBROKER provides an application program interface (API) to communicate with VMWARE. For example, VBROKER may translate VPS API calls into commands/ scripts against VBLOCK. VBROKER may be used as middleware to issue commands to various platforms (e.g., VMWARE or OPENSTACK).

VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial attached small-computer-system-interface (SAS) connectors attaching it to diverse storage processors inside the storage area network. The dual SAS connections allow the storage area network to see the disks on separate data paths and, in the event of a failure, reroute the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some implementations, the plurality of computing servers is also configured to provide a GUI for adjusting configuration settings of the virtual data center. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/time, memory or storage) for the account to particular virtual desktops and/or virtual servers in the virtual data center. The GUI may also provide a mechanism to import and/or replicate virtual machines in the virtual data center. In some implementations, the GUI may provide the ability to save a backup or snapshot of the layout and configuration of the virtual data center.

The system shown in FIG. 10 also includes a domain name server (DNS) subsystem 1040. The DNS subsystem 1040 is configured to dynamically map each domain name associated with an account to an IP address of a select virtual server or service provided for the account. For each account, the mapping of domain names is performed according to a respective set of mapping criteria indicated in a settings file of the account.

As indicated above, various mapping criteria may be utilized by the various accounts to map the domain names to the virtual servers/services. For example, the mapping criteria may map domain names as a function of the operating status of the virtual servers/services, processing load of the virtual servers (e.g., load balancing), network traffic conditions (e.g., latency and bandwidth), quality of service requirements, geographical location of an end-user submitting a DNS query, permissions of the end user, date or time of the DNS query, type of virtual server associated with the domain name, and/or number of servers associated with the domain name. In some implementations, the system provides a web-based GUI configured and arranged to allow one or more authorized users for the account to adjust the mapping criteria indicated in the settings file.

In some implementations, the DNS subsystem 1040 performs the mapping of the domain name associated with an account according to a respective set of mapping criteria indicated in a settings file of the account. For each account, the DNS subsystem 1040 may map domain names to IP addresses of the virtual servers according to various mapping criteria. For example, in some implementations, the mapping criteria may cause the DNS subsystem 1040 to map domain names based on the operating status of the virtual servers. For instance, the mapping criteria may map a domain name to a first virtual server while the first virtual server is operating correctly. In response to the first server going down, the mapping criteria may map the domain name to a backup virtual server. As another example, the mapping criteria may cause the DNS subsystem 1040 to map domain names based on processing load of the virtual servers. For instance, domain names may be mapped to balance processing load between a plurality of virtual servers. In some implementations, the mapping criteria may cause the DNS subsystem 1040 to map domain names based on the geographical location of the user submitting a domain name query to the DNS subsystem 1040.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective set of mapping criteria may be used for each account. This allows the domain names mapping criteria to be customized for the particular needs and services of each account. In some implementations, the DNS subsystem 1040 provides a representational state transfer (REST) API for configuration of DNS mapping for an account. In some implementations domain templates, having various preconfigured mapping criteria, may be provided for easy configuration of the DNS subsystem 1040 for an account. In some implementations, the DNS subsystem 1040 auto-configures mapping based on virtual services provided for the account by the other subsystems (e.g., 1015, 1020 and/or 1030).

In some implementations, the DNS subsystem 1040 provides a web-based GUI configured and arranged to allow one or more authorized users of the account to adjust the mapping criteria indicated in the settings file. An authorized user may specify a single set of mapping criteria for all virtual servers associated with the account or may specify a different set of mapping criteria for different types of virtual servers or for different virtual servers of the same type. Further, an authorized user may specify different sets of mapping criteria for different departments or users associated with the account.

In this example, the system also includes a fourth subsystem (Watchdog) 1050 configured to monitor status of the virtual servers/services provided for the various accounts. The Watchdog subsystem 1050 is configured to determine the operating status of the virtual servers/services provided for each account. For instance, Watchdog subsystem 1050 may be configured to monitor services provided by the other subsystems (e.g., 1015, 1020 and/or 1030) for fall over. Watchdog subsystem 1050 may provide domain monitoring across multiple services. The Watchdog subsystem 1050 may provide real-time event tracking for the services for each account.

In some implementations, the Watchdog subsystem 1050 provides a GUI for display and analysis of the operating status of virtual servers/services provided for an account. In some implementations, the GUI is configured to display a respective timeline for each of a plurality of servers. Each timeline may have graphical time blocks for each of the plurality of time periods. Each time block has a graphical indication that describes the operating state of the server during the corresponding time period. The timelines may be rearranged by a user for visual comparison and analysis of the operating state of the virtual servers/services. Such visual analysis may be useful, for instance, for distinguishing between network events affecting multiple servers, and server events affecting an individual server.

Consistent with the above described examples, in some implementations, the Watchdog subsystem 1050 may be configured to provide an alert to one or more authorized users of the account if the operating status of the virtual servers/services satisfies alert criteria indicated in an alert policy for the account. The Watchdog subsystem 1050 may provide alerts using various messaging mechanisms including, for example, SMS text messages, automated phone calls, emails, and/or other messaging services (e.g., Facebook, Myspace, Twitter, and/or Instant Messengers). In some implementations, multiple notifications are sent to multiple recipients and/or use multiple types of messages. In some implementations, the GUI for adjusting mapping criteria may also be used to adjust the trigger conditions and/or alert message options.

In some implementations, the DNS subsystem 1040 is configured to map domain names to the virtual servers/services based on the operating statuses of the virtual servers/services, as determined by the Watchdog subsystem 1050. For example, the DNS subsystem may be configured to remap a domain name from a first virtual server to a backup virtual server in response to the first virtual server becoming unresponsive.

The system shown in FIG. 10 also includes a subsystem (Z Common) 1060 configured to provide usage and/or expense reporting for various services provided for an account. The subsystem handles rate plans, usage statistics, and reporting for various services of the system. The Z Common subsystem 1060 may bill services using flat rates for specified time-periods (e.g., a monthly rate), or using service rates indicating a specified service rate for a specified amount of use (e.g., time, amount of data, and/or number of users). The Z Common subsystem 1060 is configurable as a plug-and-play component to provide customizable reporting services for various independent systems. In some implementations, a GUI is provided for authorized users to manage services, reporting options, payment options, account specific alerts, and/or various administrated options. In some implementations, the GUI provides an interface for a user to configure subscription and reporting options.

The system includes a subsystem (Z Control) 1010, which configures settings of one or more of the subsystems for respective accounts of the system. In some implementations, the Z Control subsystem 1010 stores data indicating services, provided by the various subsystems (e.g., 1015, 1020, 1030, 1040 and/or 1050), which are subscribed to for each account. The Z Control subsystem 1010 may further store user-configurable settings for the subscribed to services for each respective account. For example, the settings for an account may indicate settings for one or more virtual servers provided for the account by the VPS subsystem 1020. In some implementations, the Z Control subsystem 1010 may provide a GUI for authorized users of an account to manage virtual services subscriptions, and/or various administrated options.

In some implementations, the Z Control subsystem 1010 may also store settings for third-party customers of an individual client account. For example, a provider of an online service may have an account subscribing to one or more virtual servers specifically configured to provide the online service. The service provider may have third-party customers which pay for use of the online services of the service provider. In some implementations, the Z Control subsystem 1010 may store data indicating third-party customers for an account and services to be provided for each third-party customer. The Z Common subsystem 1060 may be configured to manage and track usage and/or expenses for each third-party customer of a client account. Reporting options may be individually configured for each third-party customer of an account. In some implementations the reporting options for each account and/or for each third-party customer of an account may be stored by the Z Control subsystem 1010. In some implementations, the Z Control subsystem 1010 may provide a GUI for authorized users of an account to manage virtual services subscriptions, third-party customers, billing/payment, account specific alerts and/or various administrated options.

Various aspects and features may be better understood with reference to the following example use-case. In this example, a company ABC, Inc. has decided to move the company's infrastructure from their in-house rack servers to cloud-based virtual servers. Currently, the company hosts numerous resources in-house including two custom web application servers, a mail server, a file server, an Active Directory Server and around 65 dedicated desktop machines. A company manager decides to subscribe to a set of virtual servers to be provided. For instance, the manager may opt to have the VPS subsystem provide virtual servers to replace ABC, Inc.'s in-house servers. In this example, the manager may choose between usage-based or monthly flat-rate billing for the virtual servers.

In one account creation scenario, the manager submits a sales request or contacts a sales representative/admin to discuss his needs and selection. Upon selecting a specific offering, a user account is created for the manager and the ABC, Inc. customer account is created on his behalf by the manager. Since the ABC, Inc. account is created in this manner, the manager can select from an array of billing types for this account (Auto-Charge, Invoice Net or Prepaid.)

In another account creation scenario, the manager signs up for an account through a web portal. After making server selections, the manager is guided through the account creation process. The account is automatically created as an auto-charge account.

In these two scenarios, the manager may provide server information, user information and account and billing information for account configuration. The server information may include, for example, a server hostname, a location of the server (or cluster), and or a base image of the server (e.g., Linux Distro and version). The user information may include, for example, first and last name, email, phone number and/or a password. The account and billing information may include, for example, company name, referral info and/or credit card information for a one-time or recurring billing. Using the information provided by the manager, an account and subscription may be created using the process shown in FIG. 3, for example.

Various service/rate plans that may be selected corresponding to various services that may be provided by the subsystems. The manager may configure the account to allow other users within the ABC, Inc. organization to assist in the configuration/administration of virtual servers/resources provided by the system. In some implementations, the subscription is created from a rate_plan, which is a record stored in the Z Control subsystem that contains information about a salable resource. The information may include, for example, a rate_plan name, which is a machine-readable code referenced in the service application to apply the correct resources to the actual usable resource. The information may also include a human-readable name of the rate_plan and a description of the plan. The information may further include a state of the plan (active, inactive, and/or hidden). In some implementations, a promo_code may be used by a customer to access a hidden rate_plan and create a subscription from it. The information for the rate_plan may also include a category, indicating which service application offering the plan belongs to (VPS, Enterprise Cloud, DNS, etc.). The information may indicate a rate_type (subscription, usage or one-time), and/or cost of the rate_plan. The cost of the rate_plan may be stored as a hash that includes the cost for multiple reporting periods (monthly, quarterly, or annually). The information for the plan may also indicate start and end dates, so that specials/promos can be set and run automatically.

In one scenario, a rate_plan is selected when the manager signs up for the VPS service. A subscription object is created that is a copy of the rate_plan with additional information that relates the subscription to the ABC, Inc. account and provides information about when and how it was created. For instance, the subscription object may indicate the day the subscription was started for determining reporting period.

In some implementations, a processing circuit (e.g. the Z Common subsystem in FIG. 10) runs a reporting process, which looks through all accounts and creates subscription cycles, usage statistics, invoices and receipts based on the status of the subscriptions on the account. For instance, if the manager signed up for the VPS service on the 15$^{th}$ day of a month, on the 15th of each month the ABC, Inc. account will be included in the conditional match run by the biller object. An expense or usage report will be created for each service and the provided credit card will be charged for the total. The biller will generate a receipt and send it to the manager's email address.

As a further use-case, ABC, Inc. may later decide to subscribe to additional virtual servers. For instance, a year later, ABC, Inc. may have added 20 new sales agents to their staff. Instead of buying 20 new desktops, the manager may opt to host virtual desktops in the cloud (e.g., using the VDI subsystem). The account may be configured to separately track each virtual resource with a respective invoice. Rather than creating a separate account to handle these resources, the system allows the manager to create a department account named "ABC, Inc. Sales" which belongs to the parent account "ABC, Inc." The manager can administrate the provisioning and management of the virtual resources for this department and he can add administrative users to these departments just as he can for the parent account. This allows separate accounting to be maintained for multiple departments, while allowing ABC, Inc. to pay for subscriptions of all departments with a single transaction.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a computing server, a network monitor, and/or a GUI). For example, in certain of the above-discussed embodiments, one or more modules are discrete logic circuits or programmable logic circuits configured and arranged for implementing these operations/activities, as in the blocks shown in FIGS. 1-10. In certain embodiments, such a programmable circuit includes one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, in which the first module includes a first CPU hardware circuit with one set of instructions, and the second module includes a second CPU hardware circuit with another set of instructions.

Certain embodiments are directed to a computer program product (e.g., nonvolatile memory device), which includes a machine or computer-readable medium, having stored thereon, instructions which may be executed by a computer (or other electronic device) to perform these operations/activities.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure, even though the combination is not explicitly shown or explicitly described as a combination. The disclosure may also be implemented using a variety of approaches such as those involving a number of different circuits, operating systems, and/or software programs/packages. Such modifications and changes do not depart from the true spirit and scope of the present disclosure, including that set forth in the following claims.

What is claimed is:

1. An apparatus, comprising
    a data storage device;
    a set of computing servers communicatively coupled to the data storage device and configured and arranged to provide a respective virtual data center for each of a plurality of accounts, wherein the respective virtual data center for each account is configured and arranged to provide virtual services specified in a respective settings file for the account stored in the data storage device, the virtual data center for a first account of the plurality of accounts including
        a set of virtual desktops, and
        a set of virtual servers, including at least one Voice-over-IP (VoIP) server configured to provide VoIP services for a plurality of users of the first account; and
    a processing circuit communicatively coupled to the set of computing servers and configured and arranged to, for each of the plurality of accounts, provide respective support services, specified in the settings file for the account, the support services including a domain name server (DNS) configured and arranged to dynamically map domain names of a respective set of domain names to network addresses of the one or more of the set of virtual servers provided for each of the plurality of accounts according to a mapping function indicated in the respective settings file of the account and monitor operating status of the one or more of the set of virtual servers using a set of criteria indicated in the settings file of the respective account, the settings file for the first account including the mapping function and the set of criteria customized for the first account; and
    wherein the dynamically mapping includes, in response to changes in the monitored operating status, the processing circuit being configured and arranged to use the mapping function in the settings file to change mapping correspondence between the respective set of domain names and the network addresses.

2. The apparatus of claim 1, wherein
    the set of virtual servers includes a group of virtual VoIP servers;
    the mapping function maps at least one domain name, corresponding to a VoIP service, based on processing load of a group of virtual VoIP servers, to balance VoIP traffic load across the group of virtual VoIP servers; and
    the respective settings file customized for the first account specifies users to be provided the virtual services and usage limits for each user, the respective set of criteria that defines operating statuses of the respective set of virtual servers, and prioritization of the virtual services specified in the respective settings file.

3. The apparatus of claim 1, wherein
    for the first account, the processing circuit is further configured and arranged to monitor and determine the operating status of each of the set of virtual servers in each of a plurality of time periods using the set of criteria indicated in the settings file of the first account, wherein the operating statuses are associated with a fully operational virtual server, a non-responsive virtual server, and a virtual server that is responsive and exhibits at least one indication of incorrect operation or excessive load;

the mapping function in the settings file for the first account maps at least one domain name to one of the set of virtual servers based on the operating status of the set of virtual servers; and wherein the settings file for each account includes an allocation of computing resources for the respective account.

4. The apparatus of claim 1, wherein the mapping function in the settings file for the first account maps at least one domain name to one of the set of virtual servers based on a geographical location of an end-user submitting a domain name query to the DNS;

the settings file for a second account of the plurality of accounts includes a mapping function that maps at least one domain name to one of a second set of virtual servers provided for the second account based on permissions indicated in the settings for a user submitting a DNS query;

the settings file for a third account of the plurality of accounts includes a mapping function that maps at least one domain name to one of a third set of virtual servers provided for the third account based on a date or time of a DNS query; and the settings file for a fourth account of the plurality of accounts includes a mapping function that maps at least one domain name to one of a fourth set of virtual servers provided for the fourth account based on types of servers included in the fourth set of virtual servers.

5. The apparatus of claim 1, wherein for each virtual server in the set of virtual servers, the network addresses includes an IP address of the at least one computing server that provides the virtual server, and a port number of computing server assigned to the virtual server.

6. The apparatus of claim 1, wherein the processing circuit is further configured and arranged to:

for at least one of the plurality of accounts, the respective support services specified in the settings file for the account, monitor an operating state of a set of virtual servers provided for the account and generate an alert message to one or more users specified in a respective alert policy included in the settings file for the account in response to the operating state of the set of virtual servers satisfying a set of alert criteria indicated in the alert policy; and for each respective account, the respective support services specified in the settings file for the account, monitor an operating state of each of a set of virtual servers provided for the account, and provide a graphical user interface (GUI) configured and arranged to display, for each server of the set of virtual servers, a respective timeline graphically indicating status of the virtual server, wherein the GUI is configured and arranged to facilitate adjustment of mapping criteria indicated in the settings file.

7. An apparatus, comprising a data storage device;

a set of computing servers communicatively coupled to the data storage device and configured and arranged to provide a respective virtual data center for each of a plurality of accounts, wherein the respective virtual data center for each account is configured and arranged to provide virtual services specified in a respective settings file for the account stored in the data storage device, the virtual data center for a first account of the plurality of accounts including a set of virtual desktops, and a set of virtual servers, including at least one Voice-over-IP (VoIP) server configured to provide VoIP services for a plurality of users of the first account; and a processing circuit communicatively coupled to the set of computing servers and configured and arranged to, for each of the plurality of accounts, provide respective support services specified in the settings file for the respective account of the plurality of accounts, wherein the support services for the first account dynamically maps domain names of a respective set of domain names to network addresses of the set of virtual servers provided for the first account according to mapping criteria indicated in the settings file of the first account and customized for the first account, and the processing circuit is further configured and arranged to monitor an operating state of each of the set of virtual servers for the plurality of accounts.

8. The apparatus of claim 7, wherein:

the support services for the first account further provide an alert message to one or more users specified in a respective alert policy included in the settings file for the first account in response to the operating state of the set of virtual servers satisfying a set of alert criteria indicated in the alert policy; and the settings file for each respective account specifies an allocation of computing resources as a function of processing load and a priority of the virtual services.

9. The apparatus of claim 8, the set of computing servers are configured and arranged to adjust settings of the respective set of virtual servers for each of the plurality of accounts according to a respective server settings file for the account; and the alert policy included in the settings file for the first account includes a respective set of alert criteria, for the set of virtual servers of the first account.

10. The apparatus of claim 9, wherein the alert criteria for at least one virtual server is specified as a function of an operating state of the virtual server.

11. The apparatus of claim 9, wherein the alert criteria for a first virtual server is specified as a function of a processing load of the virtual server; and the alert criteria for a second virtual server is specified as a function of memory usage of the virtual server.

12. The apparatus of claim 9, wherein the alert criteria for a first virtual server is specified as a function of response time or latency of the virtual server;

the alert criteria for a second virtual server is specified as a function of a current number of users; and the alert criteria for a third virtual server is specified as a function of a quality of service provided by the virtual server.

13. The apparatus of claim 8, wherein the processing circuit is further configured and arranged to provide the alert message to a first one of the one or more users by sending an SMS text message notification to one or more telephone numbers indicated in the alert policy;

provide the alert message to a second one of the one or more users by initiating an automated voice call to one or more telephone numbers indicated in the alert policy; and provide the alert message to a first one of the one or more users by sending an email notification to one or more email addresses indicated in the alert policy.

14. The apparatus of claim 8, wherein the processing circuit is further configured and arranged, in response to the set of alert criteria being satisfied, to perform a set of actions listed in the alert policy.

15. The apparatus of claim 7, wherein the support services for the first account further includes a provided web-based graphical user interface (GUI) configured and arranged to, for each server of the set of virtual servers of the first account, display a timeline having a respective time block for each of a plurality of time periods, each time block having a graphical indication of one of three states of operation corresponding to the operating state of the virtual server at a corresponding time period.

16. The apparatus of claim 15, wherein the graphical indication includes a color-coded marker having a respective color to indicate each of the three states of operation.

17. The apparatus of claim 16, wherein the GUI is configured to display the timelines of the set of virtual servers in a list, wherein the time blocks that correspond to the same time period are vertically aligned.

18. An apparatus, comprising
a data storage device;
a set of computing servers communicatively coupled to the data storage device and configured and arranged to provide a respective virtual data center for each of a plurality of accounts, wherein the respective virtual data center for each account is configured and arranged to provide virtual services specified in a respective settings file for the account stored in the data storage device, the virtual data center for a first account of the plurality of accounts including
a set of virtual desktops, and
a set of virtual servers, including at least one Voice-over-IP (VoIP) server configured to provide VoIP services for a plurality of users of the first account; and
a processing circuit communicatively coupled to the set of computing servers and configured and arranged to, for each of the plurality of accounts, provide respective support services specified in the settings file for the account, wherein the support services for the first account
dynamically map domain names of a respective set of domain names to network addresses of the set of virtual servers provided for the first account according to a mapping function indicated in the settings file of the first account;
provide a graphical user interface (GUI) including a mechanism for an authorized user of the first account to select options for reporting use of the respective set of virtual servers;
monitor use of the respective set of virtual servers and operating status of the one or more of the set of virtual servers using a set of criteria indicated in the settings file of the first account; and
generate reports, according to the selected options, for use of the respective set of virtual servers, wherein the settings file for the first account includes the mapping function and the set of criteria customized for the first account.

19. The apparatus of claim 18, wherein the GUI further includes
a mechanism for the authorized user of the first account to configure virtual servers to be provided for each user of the set of virtual servers for the first account;
a mechanism for the authorized user of the first account to adjust service rates for each user set of virtual servers for the first account; and
a mechanism for the authorized user of the first account to generate a report indicating respective use of the virtual servers by the users.

20. The apparatus of claim 18, wherein the GUI further includes
a mechanism for the authorized user of the first account to define a plurality of third-party customers;
a mechanism for the authorized user of the first account to adjust service rates for individual ones of the plurality of third-party customers in the settings file for the first account; and
a mechanism for the authorized user of the first account to generate, for each of one or more third-party customers of the account, a respective report for use of the set of virtual servers by the third-party customer according to the service rates indicated in the settings file for the first account.

* * * * *